United States Patent

Jeong

[11] Patent Number: 5,969,775
[45] Date of Patent: Oct. 19, 1999

[54] VIDEO DISPLAY APPLIANCE INCLUDING A DEVICE FOR ELIMINATING ELECTRIC FIELD EMITTED FROM A CATHODE RAY TUBE

[75] Inventor: Seok Hwa Jeong, Kyoungsangbuk-Do, Rep. of Korea

[73] Assignee: LG Electronics, Inc., Seoul, Rep. of Korea

[21] Appl. No.: 08/855,312

[22] Filed: May 13, 1997

[30] Foreign Application Priority Data

May 13, 1996 [KR] Rep. of Korea ........................ 96-15811

[51] Int. Cl.⁶ ...................................................... H40N 5/65
[52] U.S. Cl. .................................. 348/819; 315/8; 315/85
[58] Field of Search .................................. 315/8, 85, 370; 361/150; 348/819

[56] References Cited

U.S. PATENT DOCUMENTS

| | | | |
|---|---|---|---|
| 4,236,184 | 11/1980 | Palac, et al. | 348/821 |
| 4,812,946 | 3/1989 | Prigent, et al. | 361/150 |
| 5,216,326 | 6/1993 | Lundgren | 315/8 |
| 5,260,626 | 11/1993 | Takase, et al. | 315/85 |

FOREIGN PATENT DOCUMENTS

| | | | |
|---|---|---|---|
| 0 500 349 A1 | 8/1992 | European Pat. Off. | H01J 29/00 |
| 0 523 741 A1 | 1/1993 | European Pat. Off. | H01J 29/00 |
| 0 547 856 A1 | 6/1993 | European Pat. Off. | H01J 29/00 |
| 080256348 | 3/1995 | Japan | H04N 9/29 |
| 2 306 872 | 5/1997 | United Kingdom | H01J 29/00 |

*Primary Examiner*—Tommy P. Chin
*Assistant Examiner*—John A. Voisinet
*Attorney, Agent, or Firm*—Fish & Richardson P.C.

[57] ABSTRACT

A video display appliance having a device for eliminating the radiation wave emitted from a cathode ray tube. The appliance includes a shielding wire wound one to several times along the periphery of a degaussing coil. The pulses having the same level and phase, but inverse polarity to those applied to an anode of the cathode ray tube, is applied to the shielding wire, thereby offsetting the radiation wave emitted from the cathode ray tube.

7 Claims, 3 Drawing Sheets

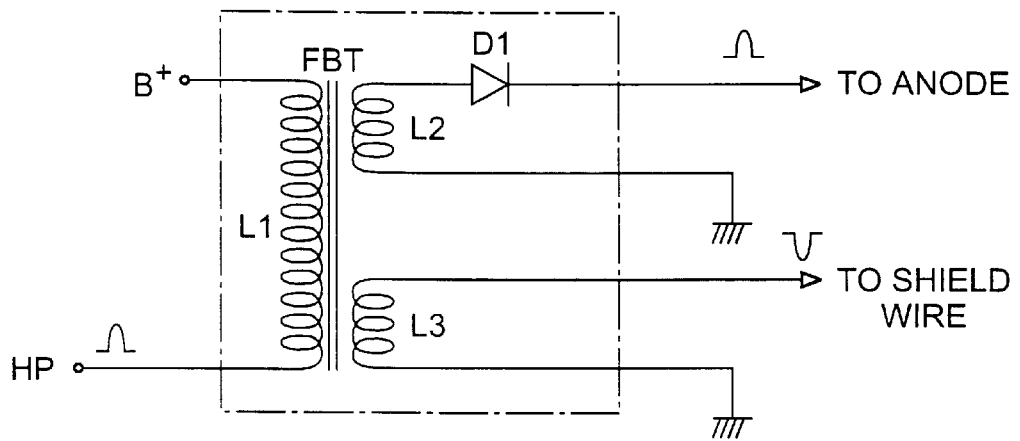
FIG. 5
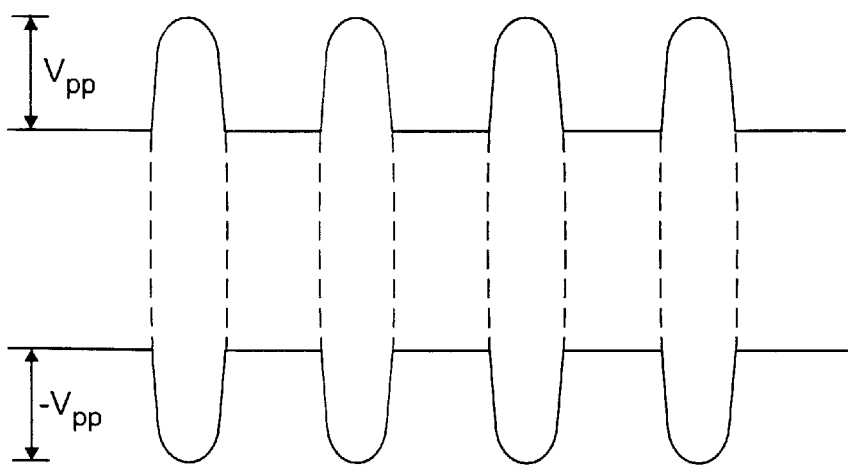
FIG. 6A
FIG. 6B

VIDEO DISPLAY APPLIANCE INCLUDING A DEVICE FOR ELIMINATING ELECTRIC FIELD EMITTED FROM A CATHODE RAY TUBE

BACKGROUND OF THE INVENTION

1. Field of the Invention

The present invention relates to a video display appliance such as a television receiver, a computer monitor, etc., and more particularly to a video display appliance including a device for eliminating the electric field emitted from a cathode ray tube.

2. Description of the Prior Art

A common video display appliance comprises a cathode ray tube (CRT), a cabinet and a back cover. The cabinet and the back cover are made of a thermoplastic material and coupled to each other so as to accommodate the CRT therein. The CRT has a high vacuum space therein, and comprises a funnel-shaped glass envelope having a faceplate and a neck, an electron gun mounted in the neck for radiating electron beams, and a deflection yoke mounted on the outside of the neck.

In such a cathode ray tube as described above, the electron beams radiating from the cathode of the electron gun are controlled, accelerated, and focused by conventional means, and then irradiated on a fluorescent screen formed on the backside of the faceplate. During these processes, horizontal flyback pulses generated by a flyback transformer are applied to a deflection yoke coil, and the high voltage from a high voltage generation section is applied to an anode, thereby generating electric fields.

In CRT as used in a display appliance, a measurable electric field may be generated by the flyback voltage pulses from the horizontal deflection circuit. With the growing use of CRT monitors in many business and recreation activities, concern has also grown about the danger of emitted electric fields to the users.

CRT manufacturers are continually attempting to achieve acceptable radiation levels according to known measuring protocols. Several methods of cancelling the electric fields in front of a CRT are known. One example is illustrated in FIG. 1.

With reference to FIG. 1, a CRT comprises a deflection yoke 2 for deflecting the electron beams radiating from an electron gun 1, a fluorescent screen 4 which radiates by the collision of the electron beams through a shadow mask 3, a high voltage generation section 5 for generating a high voltage, an anode 6 for loading the high voltage generated in the high voltage generation section 5 (for example, 24 KV or so), and a shielding panel 7 mounted on the faceplate of the CRT.

In a CRT of the above construction, the electron beams radiating from the electron gun 1 are vertically or horizontally deflected by the deflection yoke 2. The deflected electron beams come into collision with the fluorescent screen 4 through the shadow mask 3. The fluorescent screen 4 radiates by such collision and, as a result, an image is displayed on the CRT.

At this stage, horizontal flyback pulses generated by the flyback transformer (not shown) are applied to the coil of the deflection yoke 2 and high voltages generated in the high voltage generation section 5 are applied to the anode 6, thereby causing generation of the electric fields (E) expressed by $$E = \frac{V}{d} \ [V/m] \quad \text{Equation (II)}$$

wherein E is a strength of electric field, V is a voltage being applied to the deflection coil, and d is a distance of the coil.

According to the above equation, the electric field (E) is produced in proportion to the current applied thereto. Many countries have set up statutory restrictions on electric waves, and those skilled in the art have suggested approaches to eliminate the electric waves.

One approach suggested is to provide an electric field eliminator for eliminating the electric fields generated from the deflection coil on the upper part of the deflection yoke, and a coil for offsetting the electric fields on the front of the deflection yoke. To eliminate electric fields, metallic shield plates are provided on the image board coupled to the backside of the neck and on the main board positioned in the lower part of the neck. Also, to eliminate any electric field in front of a CRT, a shielding panel 7, as shown in FIG. 1, is provided on the faceplate of the CRT. Such a panel 7 is a conductive, transparent glass panel coated by indium-tin oxide.

A conventional CRT as illustrated in FIG. 1 can shield the electric fields with a panel attached to the faceplate of the CRT. However, such panels require an expensive special treatment. It is thus difficult to produce the panels in large quantities. Also, the transmittivity of the CRT monitor is lowered by such a shielding panel, thereby resulting in deterioration of the brightness of the monitor. In addition, since the shielding panel is made of glass, the operator is likely to feel eye strain due to the reflection of the panel when attaching the panel to the front of the CRT.

SUMMARY OF THE INVENTION

Therefore, it is an object of the present invention to provide a video display appliance comprising a device for eliminating radiation from the front of a cathode ray tube.

To achieve this object, one embodiment of the present invention provides a video display appliance comprising a bezel section formed on a faceplate of a cathode ray tube, a composite coil having a degaussing coil and a shielding wire wound along a periphery of the degaussing coil, and a flyback transformer having a primary winding section to which a predetermined voltage is applied, a secondary winding section which induces therein high voltage pulses in response to the voltage pulses applied to the primary winding section to provide the high voltage pulses to an anode of the CRT, and a third winding section which induces therein voltage pulses inverse to the high voltage pulses applied to the primary winding section.

It is desirable to insert the composite coil into a cabinet having a plurality of bosses and guides on one side thereof. The shielding wire is preferably made of a non-magnetic material having excellent electric conductivity and permeability, and wound one to several times, in an open loop form. The voltage pulses induced in the third winding section, which are inverse to the high voltage pulses are applied to the shielding wire.

Another embodiment of the present invention provides a device for eliminating the electric field produced in proportion to the voltage pulses applied to the deflection coil of the CRT and then emitted from the CRT.

BRIEF DESCRIPTION OF THE DRAWINGS

The above object, and other features and advantages of the present invention will become more apparent by describing the preferred embodiments thereof with reference to the accompanying drawings, in which:

FIG. 5 is a circuit diagram of the device for shielding radiation waves according to the present invention.

FIGS. 6A and 6B are waveform diagrams illustrating the waveform of the electric field radiated from a CRT and the waveform of the pulses applied to a shielding wire, respectively.

DETAILED DESCRIPTION OF THE INVENTION

Figure 1:
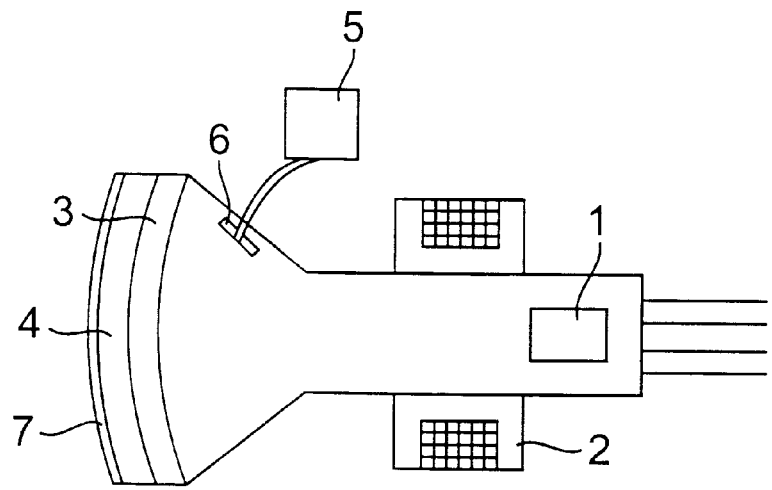
FIG. 1 is a view illustrating a conventional device for eliminating the electric field emitted from a video display appliance.
Figure 2:
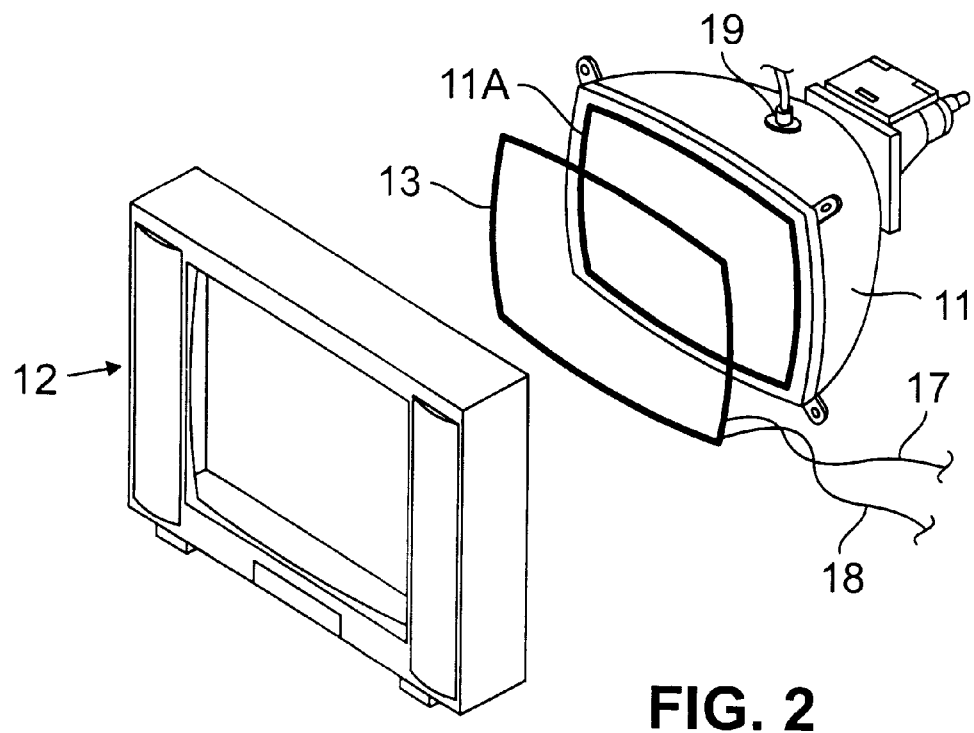
FIG. 2 is an exploded view of a video display appliance having a device for eliminating the electric field according to the present invention.
Figure 4:
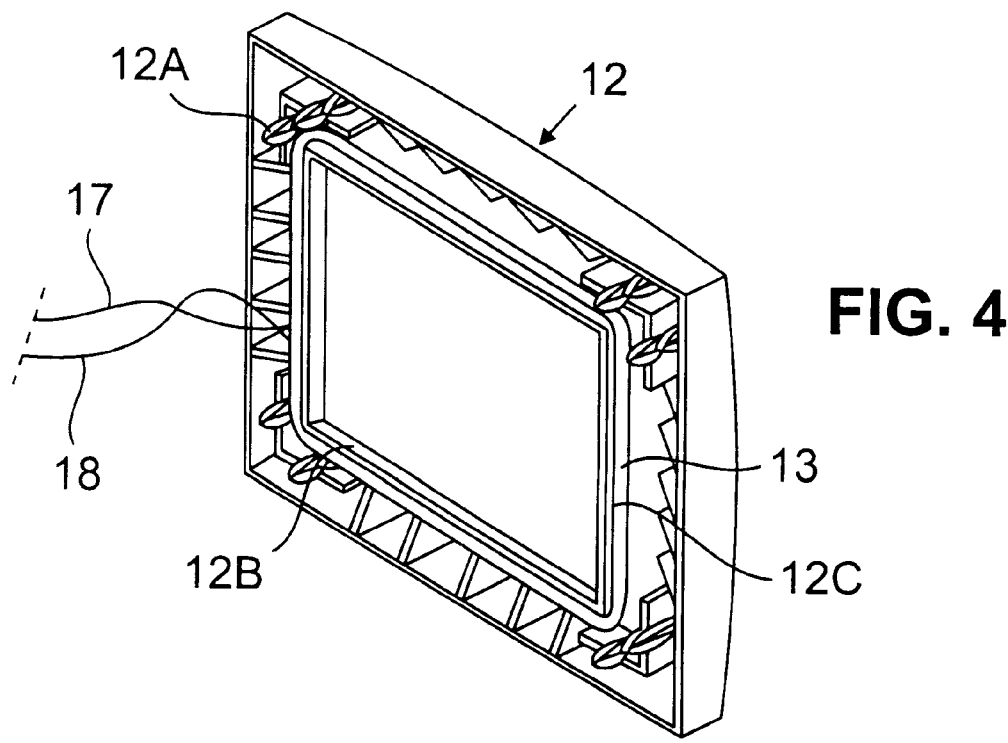
FIG. 4 is a view illustrating the structure of a composite coil in an assembled state according to the present invention.

FIG. 2 illustrates a CRT 11 which displays an image by applying a high voltage from a flyback transformer to an anode 19 thereof. The CRT 11 includes on its faceplate a bezel section 11A with a composite coil 13 mounted thereon. The composite coil 13 is clamped into a concave section 12C (shown in FIG. 4) which is formed between a boss 12A and a guide 12B provided on the side of a cabinet 12 connected to the CRT 11.

Figure 3:
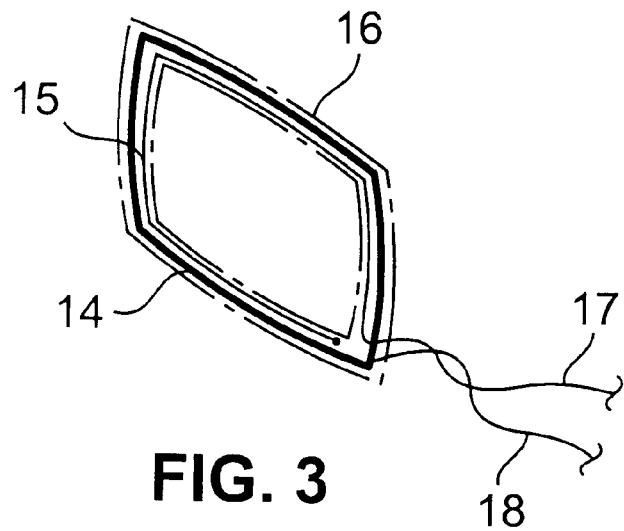
FIG. 3 is a view illustrating the structure of a composite coil according to the present invention.

The composite coil 13, as more specifically illustrated in FIG. 3, comprises a degaussing coil 14 for the elements of the CRT 11 and a shielding wire 15 wound one to several times in the form of an open loop along the periphery of the degaussing coil. The degaussing coil 14 and the shielding wire 15 are surrounded by a coating 16 for the purpose of being insulated from the outside. Lead wire 17, 18 are connected to the degaussing coil 14 and the shielding wire 15, and negative voltage pulses induced in the third winding of the flyback transformer (FBT) are supplied through lead wires 17, 18.

FIG. 5 shows a circuit of the device for eliminating the electric field according to the present invention. The circuit comprises a primary winding section L1 for producing an AC flyback voltage by the voltage from the power B+, a secondary winding section L2 for inducing a AC high voltage in response to the voltage applied to the primary winding section L1 and applying to an anode of the CRT a high voltage obtained by rectifying the induced AC high voltage through a diode D1, and a third winding section L3 for inducing pulses inverse to the high voltage pulses applied to the primary winding section and applying the induced inverse pulses to a shielding wire 15.

By the above construction, an AC current is applied through the lead wire 17 to the degaussing coil 14 of the composite coil 13 clamped into the concave section 12C formed on the inner surface of the cabinet 12, concurrently with the operation of the CRT 11.

At an initial stage when the current of the AC component is applied to the degaussing coil 14 of the composite coil 13, a large amount of current required for the degaussing of the CRT 11 is applied to the degaussing coil 14.

As a predetermined time, for example, about three seconds, lapses, the resistance of the degaussing circuit (not shown in the drawings) connected to the degaussing coil 14 increases, thereby decreasing the current flow through the degaussing coil 14. Consequently, the degaussing of the CRT 11 is achieved.

Also, as shown in FIG. 5, if predetermined horizontal voltage pulses HP are applied to the primary winding section L1 of the flyback transformer (FBT), a high voltage is induced in the secondary winding section L2 of the flyback transformer (FBT) in proportion to the turn ratio thereof, and then supplied to the anode 19 of the CRT 11 after being rectified by a diode D2. Inverse voltage pulses of, for example, about −16 to −32 V, are induced in the third winding section L3 of the flyback transformer (FBT), and then supplied to the shielding wire 15 wound round the degaussing coil 14 through the lead wire 18.

As shown in FIGS. 6A and 6B, the voltage pulse supplied to the shielding wire 15 has the same level and phase as those of the electric field emitted from the CRT 11, but has a polarity inverse thereto.

Therefore, since the pulses having the same level and phase, but inverse in polarity to the radiation wave from the CRT 11 are supplied to the shielding wire 15, it is possible to offset the radiated wave by the electric field generated by the shielding wire 15.

One skilled in the art can expect that the open-loop type shielding wire 15 is made of a non-magnetic material having excellent electric conductivity and high permeability and can be manufactured in a solid or twisted line, or in the shape of a tube, regardless of its diameter.

Various modifications and alterations that do not depart from the scope of the appended claims will become apparent to those skilled in the art. The invention is not to be unduly limited to the illustrative embodiments set forth herein.

What is claimed is:

1. The video display appliance including a device for eliminating radiation waves emitted from a cathode ray tube (CRT), comprising;

a bezel section formed on a faceplate of CRT;

a composite coil having a degaussing coil and a shielding wire wound along a periphery of said degaussing coil; and a flyback transformer having a primary winding section to which predetermined voltage pulses are applied, a secondary winding section which induces high voltage pulses therein in response to the voltage pulses applied to said primary winding section to provide said high voltage pulses to an anode of said CRT, and a third winding section which induces therein voltage pulses in opposite polarity to said high voltage pulses applied to said yrimary winding section, said voltage pulses in opposite polarity to said high voltage pulses applied to said primary winding section of said flyback transformer being applied to said shielding wire.

2. A device for eliminating an electric field produced in proportion to a current applied to a deflection coil of a cathode ray tube (CRT) and emitted from the CRT, the device comprising:

a degaussing coil for degaussing said CRT;

a shielding wire wound one to several times along a periphery of said degaussing coil; and a flyback transformer having a primary winding section to which predetermined voltage pulses are applied, a secondary winding section which induces high voltage pulses therein in response to the voltage pulses applied to said primary winding section to provide said high voltage pulses to an anode of said CRT, and a third winding section which induces therein voltage pulses opposite in polarity to said high voltage pulses applied to said primary winding section and applies said induced voltage pulses to said shield wire.

3. The device according to claim 2, wherein said voltage pulses induced in said third winding section are in phase with said high voltage pulses applied to said primary winding section.

4. The video display appliance according to claim 1, wherein said third winding section is electrically connected with said shielding wire.

5. The video display appliance according to claim 1, wherein said voltage pulses induced in said third winding section are substantially equal in magnitude and of opposite polarity to said voltage pulses induced in said second winding section.

6. The video display appliance according to claim 1, wherein said shielding wire is made of a non-magnetic material having high electric conductivity and permeability.

7. The video display appliance according to claim 1, wherein said shielding wire comprises one to several turns arranged in an open loop.

* * * * *